Figure 4:
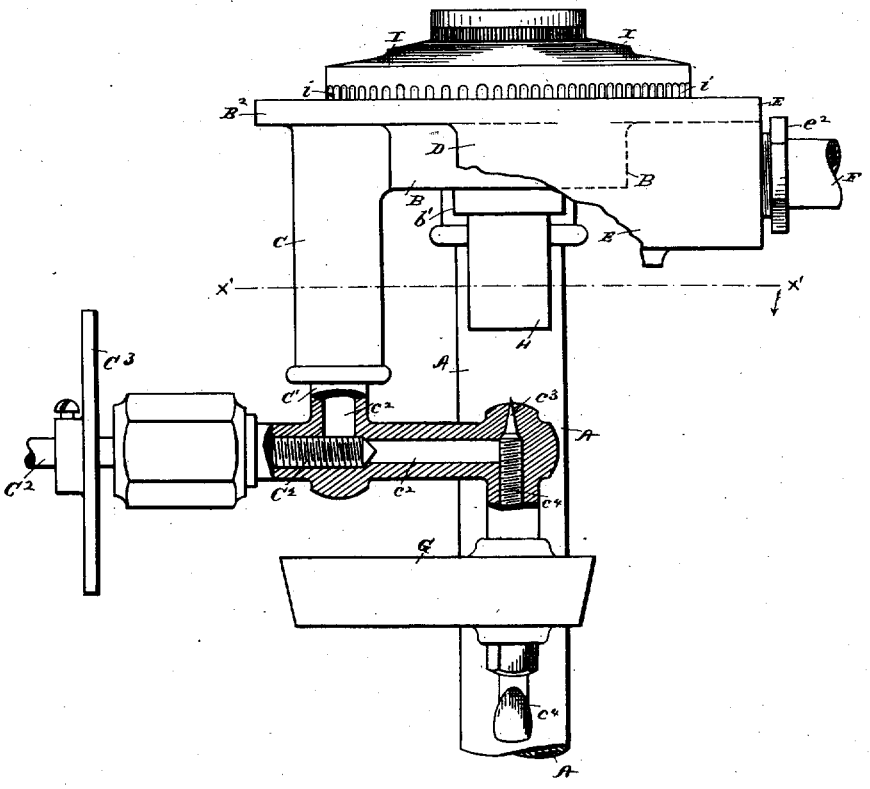

2 Sheets—Sheet 1.
C. H. CHILDS.
VAPOR BURNER.
No. 11,024. Reissued Aug. 20, 1889.
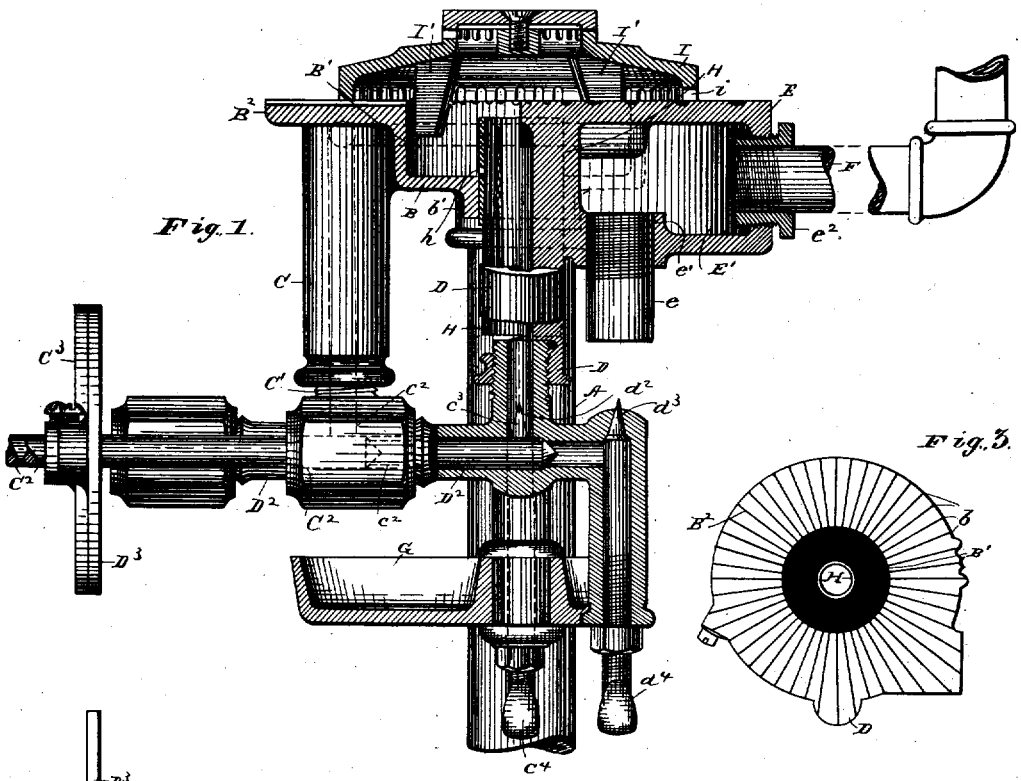
Fig. 1.
Fig. 3.
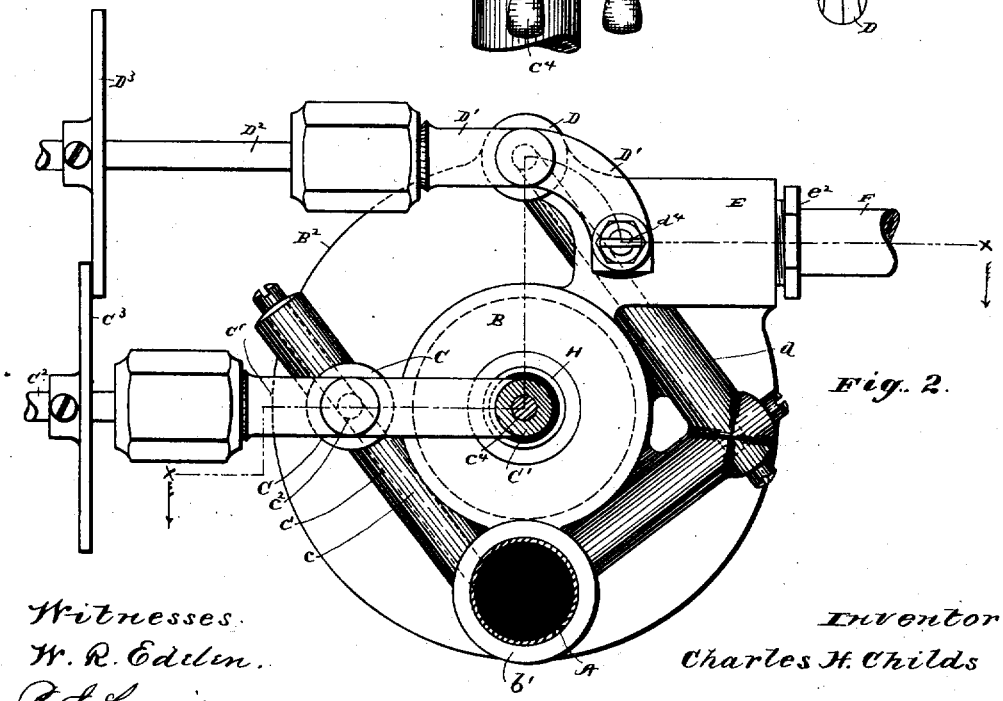
Fig. 2.
Witnesses.
W. R. Edelen.
P. S. Lowrie.
Inventor
Charles H. Childs
By Leggett & Leggett
Att'ys
N. PETERS, Photo-Lithographer, Washington, D. C.

2 Sheets—Sheet 2.

C. H. CHILDS.

VAPOR BURNER.

No. 11,024. Reissued Aug. 20, 1889.

Witnesses
W. R. Edelin.
P. S. Lowrie.

Inventor
Charles H. Childs
By Leggett & Leggett.
Att'ys

N. PETERS, Photo-Lithographer, Washington, D. C.

UNITED STATES PATENT OFFICE.

CHARLES H. CHILDS, OF CLEVELAND, OHIO.

VAPOR-BURNER.

SPECIFICATION forming part of Reissued Letters Patent No. 11,024, dated August 20, 1889.

Original No. 399,183, dated March 5, 1889. Application for reissue filed May 29, 1889. Serial No. 312,667.

*To all whom it may concern:*

Be it known that I, CHARLES H. CHILDS, of Cleveland, in the county of Cuyahoga and State of Ohio, have invented certain new and useful Improvements in Vapor-Burners; and I do hereby declare the following to be a full, clear, and exact description of the invention, such as will enable others skilled in the art to which it pertains to make and use the same.

My invention relates to improvements in vapor-burners in which the burner-cap for heating has a serrated lower edge and sits on a flange of the commingling-chamber, the latter having a series of radial grooves made to mismatch the serrations of the cap, to the end that the jets of flame issuing from the burner are thus made irregular in cross-section and thereby present a greater surface to the action of the air, and better results accrue in consequence of such irregular flame-jets.

My invention also relates to the details of construction hereinafter described, and pointed out in the claims.

In the accompanying drawings, Figure 1 is an elevation partly in section. Fig. 2 is a bottom plan. Fig. 3 is a top plan view of the primary commingling-chamber, and Fig. 4 is an elevation with parts in section.

A represents the stand-pipe, that screws into a boss $b'$, the latter being integral with the primary commingling-chamber B. This commingling-chamber has the ordinary cup-shaped formation and is provided with depending eduction-tubes C and D. Ribs $c$ and $d$ on the under surface connect the said tubes with the boss $b'$, with retorts $c'$ and $d'$ formed in the ribs to connect internally the upper end of the stand-pipe to the respective eduction-tubes C and D. The primary commingling-chamber has a laterally-projecting boss E, cored to form the secondary commingling-chamber E′, from which leads the tube F, which connects with the lighting-burner. (Not shown.) The chamber B has a cup-shaped depression B′, and in a central hole made through the bottom wall of such depression is placed an induction-tube H, the latter being provided with a drip-hole $h$, for supplying the lighting-cup G. Primary commingling-chamber B terminates in a broad laterally-projecting flange $B^2$, the upper surface of the flange forming a seat for the burner-cap I. This cap has a depending rim, the lower edge of which is serrated, as shown at $i$, while the flange $B^2$ has a series of radial grooves $b$, that mismatch with the serrations of the cap by reason of there being a greater number of the one than of the other. Depending wings I′ of the cap hold the latter in a central position on the flange $B^2$. Valve-arm C′ screws into the lower end of the eduction-tube C, such valve-arm having a duct $c^2$, that leads to the jet-orifice $c^3$, the latter being regulated by the needle-valve $c^4$, while the duct is closed by a hand-valve $C^2$. Valve-arm D′ screws into the lower end of the eduction-tube D, this arm having a duct $d^2$, leading to the jet-orifice $d^3$, the latter being regulated by a needle-valve $d^4$, with hand-valve $D^2$ for closing the duct. Jet-orifice $c^3$ discharges into the induction-tube H for supplying the primary or heating burner, and jet-orifice $d^3$ discharges into an induction-tube $e$ for supplying a lighting-burner. The tube $e$ screws into a threaded hole in the bottom wall of boss E, by means of which the tube can be raised or lowered to bring the bottom end thereof in such juxtaposition with jet-orifice $d^3$ as will regulate the supply of air to give the best results at the lighting-burner. An internal upwardly-projecting flange $e'$ prevents any dripping through induction-tube $e$ in case of condensed vapor returning to the secondary commingling-chamber E′.

The orifice where tube F is inserted is usually of considerable size for convenience in coring chamber E′, a bushing $e^2$ being employed to reduce the orifice to the size of the pipe F, thus leaving considerable space below the pipe at the bottom of chamber E′ for receiving the condensed vapors. Boss E, being integral with the primary generator, is kept intensely heated by the heating-burner, and any liquid in chamber E′ had from condensation of vapors in pipe F is quickly revaporized.

The tube F leads first laterally and then upward to bring the lighting-burner to the desired location, usually some feet above the top of the stove and so far to one side as to be entirely out of the way. As aforesaid, the needle-valves $c^4$ and $d^4$ are set to regulate the discharge of the respective jet-orifices, and may be changed a trifle from time to time, if necessary, by the aid of a wrench. These jet-orifices, therefore, are not enlarged or injured by closing of these valves, and the operator in starting the stove has no nice adjustment of valve to make, but, on the contrary, can turn valves $C^2$ and $D^2$ wide open.

Through inadvertence frequently valve $C^2$ is closed to extinguish the heating-burner, leaving valve $D^2$ wide open, in consequence of which there is much waste of gasoline as soon as the generator cools down. To avoid this I mount disks $C^3$ and $D^3$ on the respective valve-stems, these disks being made to overlap each other and abut each other when the valves are open or closed, disk $C^3$ being placed outside, as shown in Figs. 1 and 2. With this arrangement valve $D^2$ must be closed before it is possible to close valve $C^2$. By reason of grooves *b* and serrations *i*, arranged as aforesaid, the jets of flame issuing from the heating-burner, instead of being round, are thin and irregular in cross-section, thus exposing a great surface of flame to the air, and this is found to add considerably to the heating capacity of the burner.

The heating-burner is operated substantially the same as ordinary burners. The gasoline, being first admitted through jet-orifice $c^3$, strikes burner-cap I, and, falling back into the cup B′, is discharged from thence through the orifice *h* and induction-tube H into the lighting-cup below. After the heating-burner is in full operation, by means of valve $D^2$ vapor may be discharged to the lighting-burner whenever it is needed.

What I claim is—

1. The combination, with the commingling-chamber having a laterally-projecting flange and a series of radial grooves in the top surface of the flange, of a burner-cap having a series of notches or serrations in its under side, said burner-cap being adapted to rest on the flange of the said commingling-chamber, substantially as set forth.

2. The combination, with a commingling-chamber having a laterally-projecting flange with a series of grooves on the surface of the flange, substantially as indicated, of a burner-cap having a depending rim with a serrated lower edge, said serrations being made to mismatch the grooves of the generator-flange, and wings connected with the burner-cap for engaging the inner wall of the primary commingling-chamber to hold the cap centrally, substantially as set forth.

3. The combination, with primary and secondary induction-tubes, of valve-arms having ducts and jet-orifices, hand-valves for opening and closing the ducts, and stops mounted on the respective valve-stems, said stops overlapping and abutting each other, with the valves in open or closed position, substantially as set forth.

4. In a vapor-burner, in combination, the secondary generator integral with a primary generator, an eduction-tube connected with the secondary generator, such tube having an upright arm for illuminating purposes, and a depression or pocket of the secondary generator for receiving the condensed vapor from such eduction-tube and for holding the same until revaporized, substantially as set forth.

In testimony whereof I sign this specification, in the presence of two witnesses, this 18th day of May, 1889.

CHARLES H. CHILDS.

Witnesses:

CHAS. H. DORER,

ALBERT E. LYNCH.